(12) United States Patent
Yudin et al.

(10) Patent No.: US 11,449,183 B1
(45) Date of Patent: Sep. 20, 2022

(54) TOUCH PANEL SENSOR WITH OPTIMAL ELECTRODE SEPARATION FOR IMPROVED PERFORMANCE

(71) Applicant: Sharp Display Technology Corporation, Kameyama (JP)

(72) Inventors: Alex Yudin, Oxford (GB); Andrew Kay, Oxford (GB); Shinichi Miyazaki, Kameyama (JP)

(73) Assignee: Sharp Display Technology Corporation, Mie (JP)

( * ) Notice: Subject to any disclaimer, the term of this patent is extended or adjusted under 35 U.S.C. 154(b) by 0 days.

(21) Appl. No.: 17/350,613

(22) Filed: Jun. 17, 2021

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04112* (2013.01)

(58) Field of Classification Search
CPC ................ G06F 3/0446; G06F 3/0412; G06F 2203/04112
See application file for complete search history.

(56) References Cited

U.S. PATENT DOCUMENTS

| | | | |
|---|---|---|---|
| 5,841,078 A | 11/1998 | Miller et al. | |
| 10,845,902 B2 | 11/2020 | Clark et al. | |
| 2018/0224968 A1 | 8/2018 | Church et al. | |
| 2019/0064960 A1 | 2/2019 | Na et al. | |
| 2021/0405812 A1* | 12/2021 | He ........................ | G06F 3/0443 |

* cited by examiner

*Primary Examiner* — Peter D McLoone
(74) *Attorney, Agent, or Firm* — Renner, Otto, Boisselle & Sklar, LLP

(57) ABSTRACT

A touch panel display includes a display panel having a plurality of pixel regions that emit light, and a touch sensor having an electrode configuration that overlays the display panel. The electrode configuration includes a first electrode and a second electrode that are separated by an insulating region. The electrode separation distance between the first and second electrodes is in a range whereby (1) with increasing electrode separation distance a first rate of proportional decrease in mutual capacitance between the first and second electrodes is greater than a second rate of proportional decrease in signal magnitude of an output signal, and (2) a ratio (R) of the first rate to the second rate satisfies the relationship 1.0<R<2.5. With such parameters, the electrode separation distance may be from 30 μm to 50 μm, and/or from 0.5 to 0.75 times a pixel pitch of the pixel regions.

19 Claims, 6 Drawing Sheets

TOUCH PANEL SENSOR WITH OPTIMAL ELECTRODE SEPARATION FOR IMPROVED PERFORMANCE

TECHNICAL FIELD

The present application relates to touch panel devices, and capacitive type touch panel devices in particular including high performance mutual capacitance touch panels configured with rows and columns of electrodes for detecting conductive and non-conductive input objects.

BACKGROUND ART

Touch panels have become widely adopted as the input device for a range of electronic products such as smartphones, tablet devices, and computers. Many high-end portable and handheld electronic devices now include touch panels. These are most often used as part of a touchscreen, i.e., a display panel and a touch panel that are aligned so that the touch zones of the touch panel correspond with display zones of the display panel. The most common user interface for electronic devices with touchscreens is an image on the display panel, the image having points that appear interactive. For example, the device may display a picture of a button, and the user can then interact with the device by touching, pressing or swiping the button with a finger or with a stylus. For example, the user can "press" the button and the touch panel detects the touch (or touches). In response to the detected touch or touches, the electronic device carries out some appropriate function. For example, the electronic device may turn itself off, execute an application, perform some manipulation operation, and the like.

Although a number of different technologies can be used to create touch panel sensors, capacitive systems have proven to be the most popular due to their accuracy, durability, and ability to detect touch input events with little or no activation force. One well-known method of capacitive sensing applied to touch panels is known as mutual capacitance sensing. FIG. 1 is a drawing depicting a conventional implementation of a mutual capacitance type touch panel. In this method, as shown in FIG. 1, a drive electrode 20 and sense electrode 21 are formed on a transparent substrate (not shown). A changing voltage or excitation electrical signal is applied to the drive electrode 20 from a voltage source 22. An output signal is then generated on an electrode different from the drive electrode, referred to as the sense electrode, such as on the adjacent electrode 21 by capacitive coupling. As a result, a mutual coupling capacitance 23 is formed between the drive electrode 20 and sense electrode 21. A charge measurement device is connected to the sense electrode 21 and measures an output signal current that is indicative of the size of the mutual coupling capacitance 23. When an input object 26 is brought in close proximity to both electrodes 20 and 21, the input object forms a first dynamic capacitance 27 relative to the drive electrode 20 and a second dynamic capacitance 28 relative to the sense electrode 21. Accordingly, when an output signal occurs that is read by the charge measurement device 24, the output signal is indicative of the change in the mutual coupling capacitance 23 when a touch input object is present. If the input object is connected to ground, as is the case for example of a human finger connected to a human body, the effect of these dynamically formed capacitances is manifested as a reduction of the amount of mutual coupling capacitance 23 between the drive and sense electrodes, and hence a reduction in the magnitude of the output signal measured by the charge measurement device 24 attached to the sense electrode 21.

As described, for example, in U.S. Pat. No. 5,841,078 (Bisset et al, issued Oct. 30, 1996), by arranging a plurality of drive and sense electrodes in a grid or other tessellating pattern to form an electrode array, this mutual capacitance sensing method may be used to form a touch panel device. An advantage of the mutual capacitance method is that multiple simultaneous touch input events may be detected. By applying electrical signals to some rows and columns and measuring the electrical output signal on other rows and columns, conductive and non-conductive objects near the touch panel electrodes can be detected and localized. The output touch signal relates to the difference in mutual capacitance between row and column electrodes in a touch region when an input object is present versus when an input object is not present.

High performance touch panel sensors increasingly are being employed in combination with high resolution display technologies, such as for example in organic light-emitting diode (OLED) displays and other LED-based displays. In one type of touch panel display, a transparent touch electrode configuration may be overlaid on the display pixels so as to minimize interference with the display emission. For more effective touch panel performance, however, the touch panel row and column electrodes may be formed of a metal which is highly conductive but not transparent, and thus would interfere with display emission if the touch panel sensor electrodes were overlaid directly over the display pixels. To provide such effective touch panel sensor electrodes without interference of the display emission, touch panel row and column electrodes may be formed as an opaque metal mesh arranged as a grid with the electrodes being located outside of the regions of light emission of the display pixels so as not to alter the light emitting properties of the display pixels.

FIG. 2 is a drawing depicting a conventional touch panel display configuration 10 that employs an opaque metal mesh for the touch panel sensor electrode configuration. The touch panel display configuration 10 includes a touch panel sensor having a first or row electrode 12 and a second or column electrode 14 that are separated by a non-conductive insulating region 16 that separates the row and column electrodes by an electrode separation distance 17. The insulating region, therefore, electrically isolates the row electrodes from the column electrodes. Either electrode may act as the drive or sensing electrode, although it is common that the row electrodes are the drive electrodes and the column electrodes are the sense electrodes. The electrodes 12 and 14 are overlaid on a display panel including a plurality of pixel regions 18 that emit light corresponding to the display of an image. In the example of FIG. 2, the insulating region 16 is made by simply imparting a straight cut through the electrode mesh to separate the first electrode 12 from the second electrode 14. This simple cut through the mesh results in a non-uniform insulating region 16 having a non-constant thickness, as tendrils 44 of electrode material extend into the insulating region 16 between the pixel regions 18. Accordingly, the electrode separation distance between the first and second electrodes across the insulating region is non-uniform, as the electrode separation distance 17 where the tendrils extend into the insulating region differs from the electrode separation distance 17a where the tendrils are absent.

In the example of FIG. 2, as referenced above a straight cut is made to separate the electrodes, but a straight cut configuration is an example. As another example, FIG. 3 illustrates a touch panel configuration 10a having a non-conductive insulating region 16a that is formed by a non-straight cut configuration that "zig-zags" through the metal mesh. The configuration of FIG. 3 still bears similarity to that of FIG. 2 in that the cut leaves the tendrils 44 of electrode material that extend into the insulating region 16 between the pixel regions 18, and thus the electrode separation distance 17/17a between the first and second electrodes across the insulating region is non-uniform along the cut.

The magnitude of mutual capacitance between drive and sense electrodes is dependent on many factors including the electrode separation distance between the row and column electrodes across the insulating region, and when the electrode separation distance is increased the mutual capacitance decreases. Low mutual capacitances are desired to enable efficient, high speed application of electrical signals to the row and column electrodes. The magnitude of the output touch signal is a metric that indicates how strongly an object near the top surface of the touch panel is detected. The output touch signal in particular is a measure of the change in mutual capacitance between row and column electrodes in a touch region when an input object is brought from infinity to be in contact with the top surface of the touch panel. The electrode separation distance is configured to give reliable electrical isolation between row and column electrodes and further is configured to be invisible to the naked eye of a user. If the electrode separation distance is too small, there is a risk of electrical contact or shorting between row and column electrodes, which causes incorrect detection of objects and can also cause damage to the touch panel device. On the other hand, a larger electrode separation distance can enable efficient, high speed application of electrical signals to the row and column electrodes, but such larger electrode separation distance can result in the insulating region becoming visible to the naked eye. Such larger electrode separation distance also can lead to a reduction in touch signal magnitude as the difference in mutual capacitance becomes relatively smaller at larger electrode separation distances when an input object is present versus not present.

Accordingly, the output signal is related to the change in the mutual coupling capacitance between the sense and drive electrodes, and thus in general, electrode designs with high mutual capacitance have high magnitude signal output. Despite such higher magnitude signal output, however, the use of high mutual capacitances has drawbacks. Higher capacitive loads can be detrimental to touch panel driver performance in that higher capacitive loads affect the speed at which electrical signals can be applied to the electrodes, with signal speed decreasing as the mutual capacitance increases. Furthermore, higher mutual capacitance for increased signal output is achieved by minimizing the electrode separation distance. The interlocking metal mesh electrodes have fine features formed on thin conductive layers, and thus minimal electrode separation distance can result in defects in the formation of the electrode layer which can result in low manufacturing yield. For example, shorting defects of unwanted electrical contact between the two electrodes can occur across the insulating region.

To avoid such deficiencies, mutual capacitance can be reduced by expanding the electrode separation distance of the insulating region between the row and column electrodes. There are limits, however, on the amount by which the electrode separation distance can be increased. With increasing electrode separation distance, the insulating region eventually will become visible to the viewer as an interruption of the display emission, and the magnitude of the output signal also degrades and ultimately becomes insufficient. Prior attempts at optimization of the touch panel electrode configuration of touch panel sensors have proven deficient to balance these considerations.

SUMMARY OF INVENTION

There is a need in the art, therefore, for an improved design of a touch panel sensor having a touch electrode configuration that reduces mutual capacitance significantly, without a commensurate degrading of the output signal magnitude and while remaining invisible to a viewer. The touch electrode configuration of the present application achieves a mutual capacitance that is significantly reduced as electrode separation is increased with a high touch signal magnitude being maintained.

In conventional configurations, it is expected by one of ordinary skill in the art that the magnitude of the output touch signal would decrease proportionally to the decrease in mutual capacitance when the electrode separation distance is increased. The inventors of the current application, however, have designed a touch electrode configuration whereby as the electrode separation distance is increased within an optimal range, a disproportionately small reduction of output signal magnitude occurs. At such larger electrode separation distances within this optimal range, there essentially is an enhanced output zone in which a rate of proportional decrease in mutual capacitance is greater than a rate of proportional decrease in signal magnitude of the output signal. This permits configuring the electrode separation distance in a manner that optimally accounts for the competing considerations of lower mutual capacitance versus sufficient output signal magnitude and invisibility to the user.

In exemplary embodiments, a touch panel display includes a touch panel sensor having a touch electrode configuration that is overlaid onto a display panel that includes a plurality of pixel regions that emit light. The touch electrode configuration may be configured as an opaque metal mesh including a first electrode and a second electrode that are separated by an insulating region that electrically isolates the first electrode from the second electrode, wherein the opaque metal mesh overlays the display panel with the opaque metal mesh being positioned outside of the pixel regions that emit light. In this manner, the touch electrode configuration does not interfere with light emission from the pixel regions of the display panel. A pixel pitch of the pixel regions is defined as a distance between centers of two adjacent pixels regions in a same row or column. The electrode separation distance is defined as a distance between a first electrode and a second electrode across the insulating region in a direction perpendicular to opposing faces of the first and second electrodes. In an exemplary embodiment, the electrode separation distance is related to the pixel pitch and is from 0.5 to 0.75 times the pixel pitch. In an exemplary embodiment, the electrode separation distance is from 30 to 50 μm, and may be from 35 to 45 μm. The first and second electrodes may be arranged in rows and columns, and the first electrodes may be row electrodes and the second electrodes may be column electrodes. The row electrodes may be drive electrodes to which an electrical signal is inputted, and the column electrodes may be sense electrodes from which an output electrical signal is read.

In an exemplary embodiment, the insulating region may include a plurality of inactive electrodes arranged between the first electrode and the second electrode. The term "inactive electrodes" denotes that the inactive electrodes are formed conductively isolated from the first and second electrodes and from external electrical signals. The inactive electrodes may be formed of the same material as the first and second electrodes.

An aspect of the invention, therefore, is an improved design of a touch panel sensor having a touch electrode configuration that reduces mutual capacitance significantly, without a commensurate degrading of the output signal magnitude and while remaining invisible to a viewer. An enhanced touch panel display includes a display panel having a plurality of pixel regions that emit light, and a touch sensor having an electrode configuration that overlays the display panel. The electrode configuration includes a first electrode and a second electrode that are separated by an insulating region. The electrode separation distance between the first and second electrodes is in a range whereby (1) with increasing electrode separation distance a first rate of proportional decrease in mutual capacitance between the first and second electrodes is greater than a second rate of proportional decrease in signal magnitude of an output signal, and (2) a ratio (R) of the first rate to the second rate satisfies the relationship $1.0<R<2.5$. With such parameters, the electrode separation distance may be from 30 µm to 50 µm, and/or from 0.5 to 0.75 times a pixel pitch of the pixel regions.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF EMBODIMENTS

Figure 1:
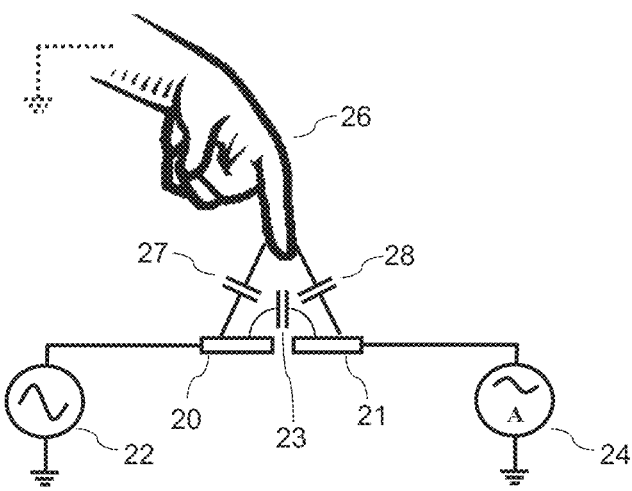
FIG. 1 is a drawing depicting a conventional implementation of a mutual capacitance type touch panel.

Embodiments of the present application will now be described with reference to the drawings, wherein like reference numerals are used to refer to like elements throughout. It will be understood that the figures are not necessarily to scale.

The present application describes an improved design of a touch panel sensor having a touch electrode configuration that reduces mutual capacitance significantly, without a commensurate degrading of the output signal magnitude and while remaining invisible to a viewer. As referenced above, in conventional configurations it is expected by one of ordinary skill in the art that the magnitude of the touch signal would decrease proportionally to the decrease in mutual capacitance when the electrode separation distance is increased. The inventors of the current application, however, have designed a touch electrode configuration whereby as the electrode separation distance is increased within an optimal range, a disproportionately small reduction of output signal magnitude occurs. At such larger electrode separation distances within this optimal range, there essentially is an enhanced output zone in which a rate of proportional decrease in mutual capacitance is greater than a rate of proportional decrease in signal magnitude of the output signal. This permits configuring the electrode separation distance in a manner that optimally accounts for the competing considerations of lower mutual capacitance versus sufficient output signal magnitude and invisibility to the user.

Figure 4:
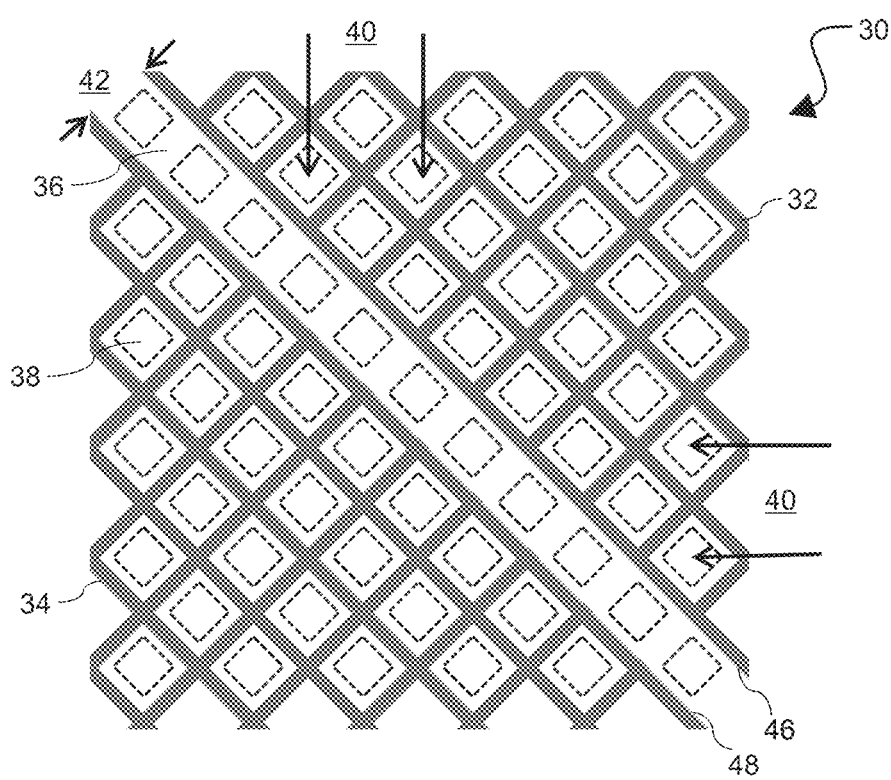
FIG. 4 is a drawing depicting a touch panel display configuration that employs an opaque metal mesh for the touch panel sensor electrode configuration in accordance with the present application.

FIG. 4 is a drawing depicting a touch panel display configuration 30 that employs an opaque metal mesh for the touch panel sensor electrode configuration in accordance with the present application. The touch panel display 30 includes a touch panel sensor having a touch electrode configuration that is overlaid onto a display panel that includes a plurality of pixel regions that emit light. The touch electrode configuration of the touch panel display 30 is configured as an opaque metal mesh including a first electrode 32 and a second electrode 34 that are separated by an insulating region 36 that electrically isolates the first electrode 32 from the second electrode 34. The opaque metal mesh configuration of the electrodes 32 and 34 overlays the display panel having pixel regions 38 that emit light for display of an image, with the opaque metal mesh being positioned outside of the pixel regions that emit light. In this manner, the touch electrode configuration does not interfere with light emission from the pixel regions 38 of the display panel. The opaque metal mesh configuration may be made of a bulk metal material, such as for example aluminum or titanium, with the wire elements that form the mesh having a width of approximately 3-5 µm. The insulating region may be made of a layer of an inorganic, non-conductive insulating material, such as for example silicon nitride (SiN) or an organic polymer.

A pixel pitch 40 of the pixel regions 38 is defined as a distance between centers of two adjacent pixel regions in a same parallel line of pixel regions, such as for example a same row or column. Two different orientation or directional relationships are identified in FIG. 4 for defining the pixel pitch 40. An electrode separation distance 42 is defined as a distance between the first electrode 32 and the second electrode 34 across the insulating region 36 in a direction perpendicular to opposing faces 46 and 48 of the first and second electrodes. In an exemplary embodiment, the electrode separation distance is related to the pixel pitch and is from 0.5 to 0.75 times the pixel pitch. In an exemplary embodiment, the electrode separation distance is from 30 to 50 µm, and may be from 35 to 45 µm. The pixel regions may be arranged in rows and columns, and thus the first and second electrodes also may be arranged in rows and columns, and the first electrodes may be row electrodes and the second electrodes may be column electrodes. The row electrodes may be drive electrodes to which an electrical signal is inputted, and the column electrodes may be sense electrodes from which an output electrical signal is read, or vice versa.

Figure 5:
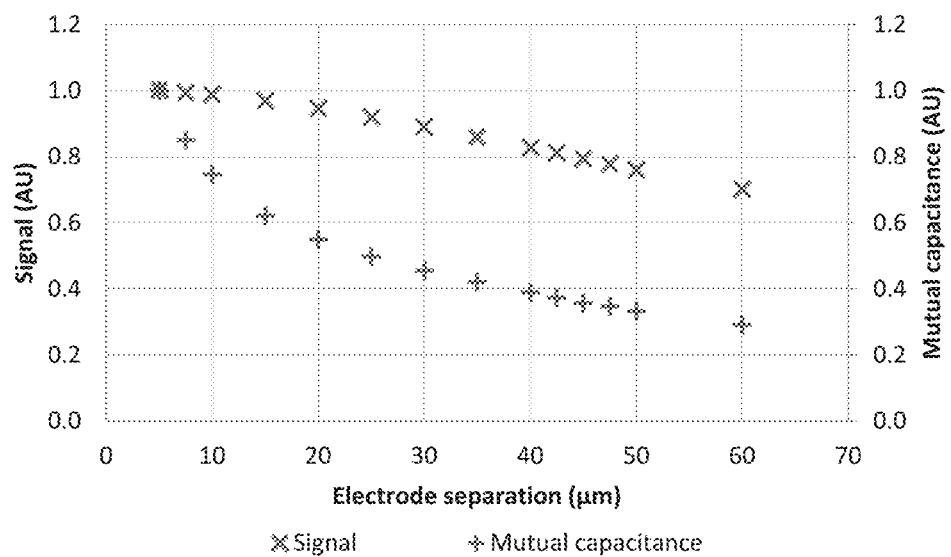
FIG. 5 is a graphical depiction of signal magnitude and mutual capacitance as a function of electrode separation distance, which illustrates advantages of the touch electrode configuration of the current application.

FIG. 5 is a graphical depiction of signal magnitude and mutual capacitance as a function of electrode separation distance, which illustrates advantages of the touch electrode configuration of the touch sensor of the current application. As seen in FIG. 5, as the electrode separation distance is increased above about 5 µm, there is a steep drop-off of mutual capacitance as compared to a drop-off of output signal magnitude. At a separation distance of about 30 µm, the difference in proportional drop-off of the mutual capacitance as compared to signal magnitude begins to flatten, with the relationship of drop-off of the mutual capacitance and signal magnitude to separation distance both becoming essentially linear with the same slope at about 50 µm. In other words, at about 50 µm and above the magnitude of the output touch signal begins decreasing proportionally to the decrease in mutual capacitance when the electrode separation distance is increased further.

As referenced above, a lower mutual capacitance (which means higher electrode separation distance) is desirable provided that the output signal magnitude remains sufficient. The electrode separation distance should therefore be at least 30 µm to gain the most benefit of the difference in proportional drop-off of the mutual capacitance versus that of the signal magnitude. Increased benefit continues to be realized up to about 50 µm, after which the proportional drop-off of the mutual capacitance and signal magnitude bear essentially a common linear relationship to electrode separation distance, indicating that the drop-off rates of mutual capacitance and output signal magnitude become the same. In the range of electrode separation distance of 30 to 50 µm, therefore, with increasing separation distance a first rate of proportional decrease in mutual capacitance still is greater than a second rate of proportional decrease in signal magnitude of the output signal, but the first and second rates are converging to the linear common relationship that occurs above 50 µm at which the first and second rates are the same. From an electrode separation distance of 30 to 50 µm, a ratio (R) of the first rate to the second rate satisfies the relationship $1.0 < R < 2.5$, which defines an optimal range of electrode separation. The optimal range of electrode separation distance referenced above of 30 to 50 µm, and more particularly 35 to 45 µm, generally meets these criteria and maximizes the benefits of the reduced mutual capacitance in that sufficient output signal magnitude is maintained. The mathematic characterization of the optimal range of electrode separation distance should be applicable more generally as display technology develops.

The electrode separation distance, therefore, has an optimal range in which there essentially is an enhanced output signal zone in which (1) with increasing separation distance a first rate of proportional decrease in mutual capacitance is greater than a second rate of proportional decrease in signal magnitude of the output signal; and (2) a ratio (R) of the first rate to the second rate satisfies the relationship $1.0 < R < 1.1$. This permits configuring the electrode separation distance in a manner that optimally accounts for the competing considerations of lower mutual capacitance versus sufficient output signal magnitude and invisibility to the user. For current high-resolution display technologies, such as for example LED and OLED displays, the desired electrode separation distance can be achieved as a result of setting the electrode separation distance in relation to the pixel pitch 40 as shown in FIG. 4. The described electrode configuration particularly is suitable for mobile device display technologies (e.g., smart phones, tablets). Common pixel pitches for such mobile display technologies may range from about 50-150 µm. Accordingly, as referenced above in exemplary embodiments the electrode separation distance is related to the pixel pitch and is from 0.5 to 0.75 times the pixel pitch, which would satisfy the criteria (1) and (2) above.

Figure 2:
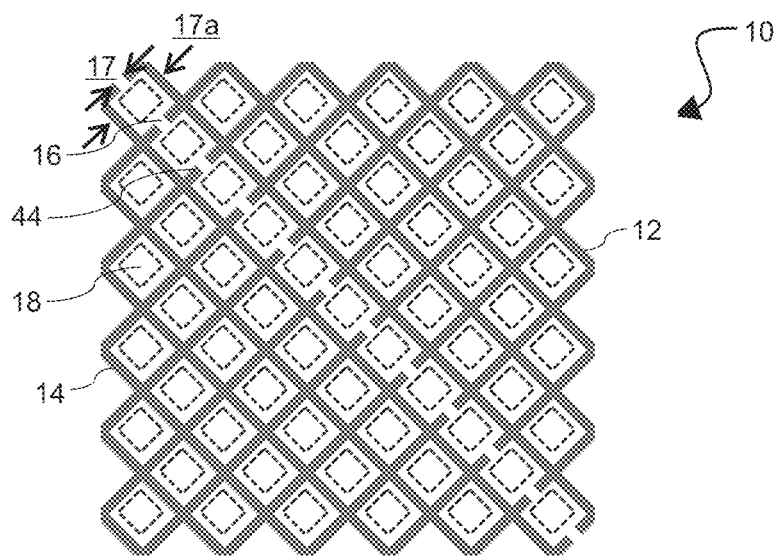
FIG. 2 is a drawing depicting a conventional touch panel display configuration that employs an opaque metal mesh for the touch panel sensor electrode configuration.
Figure 3:
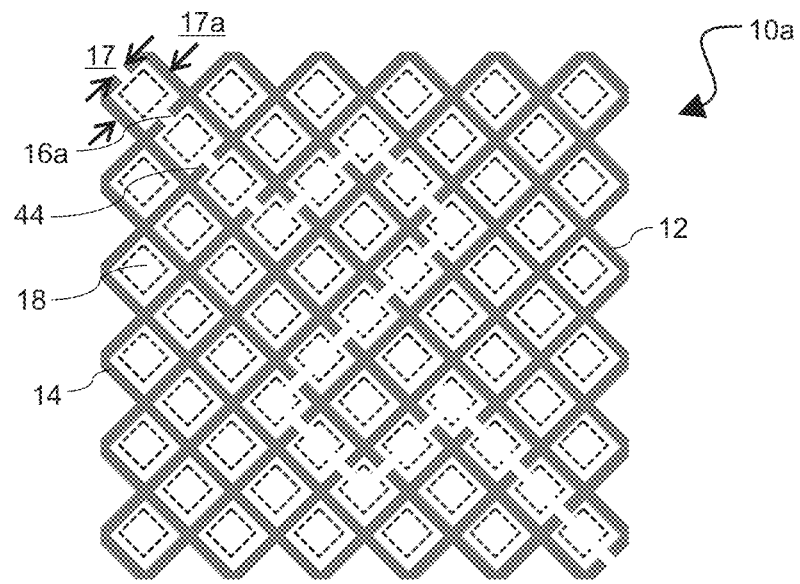
FIG. 3 is a drawing depicting another conventional touch panel display configuration that employs an opaque metal mesh for the touch panel sensor electrode configuration.

The basis for the enhanced performance, such as shown in FIG. 5, may be the elimination of electrode tendrils of the conventional configurations that extend into the portion of the insulating region between the light-emitting pixel regions. As described above as to the conventional configurations of FIGS. 2 and 3, for example, the opaque metal mesh configuration includes electrode tendrils 44 that extend into the portion of the insulating region between the light-emitting pixel regions 18. As a result, the electrode separation distance that defines the insulating region 16 is non-uniform, as seen by comparing the electrode separation distance 17 where the tendrils 44 are present versus the electrode separation distance 17a where the tendrils 44 are absent, as illustrated in FIGS. 2 and 3. These tendrils 44 tend to increase the mutual capacitance between the first electrode 12 and the second electrode 14, but the tendrils 44 have been shown not to contribute measurably to the magnitude of the output signal.

In contrast, when the electrode separation distance is expanded to the electrode separation distance 42 of FIG. 4, the tendrils 44 of the conventional configurations are eliminated, and the electrode separation distance 42 is constant and uniform between the first electrode face 46 of the first electrode 32 and the second electrode face 48 of the second electrode 34. Because the tendrils in conventional configurations tend to increase the mutual capacitance without contributing measurably to the magnitude of the output signal, the elimination of the tendrils of electrode material as shown in FIG. 4 in turn tends to reduce the mutual capacitance without a significant reduction of the signal magnitude. Accordingly, the rate of proportional decrease in mutual capacitance is greater than the rate of proportional decrease in signal magnitude of the output signal as illustrated in FIG. 5 until the electrode separation distance is large enough that the proportional decreases linearize and become the same.

Figure 6:
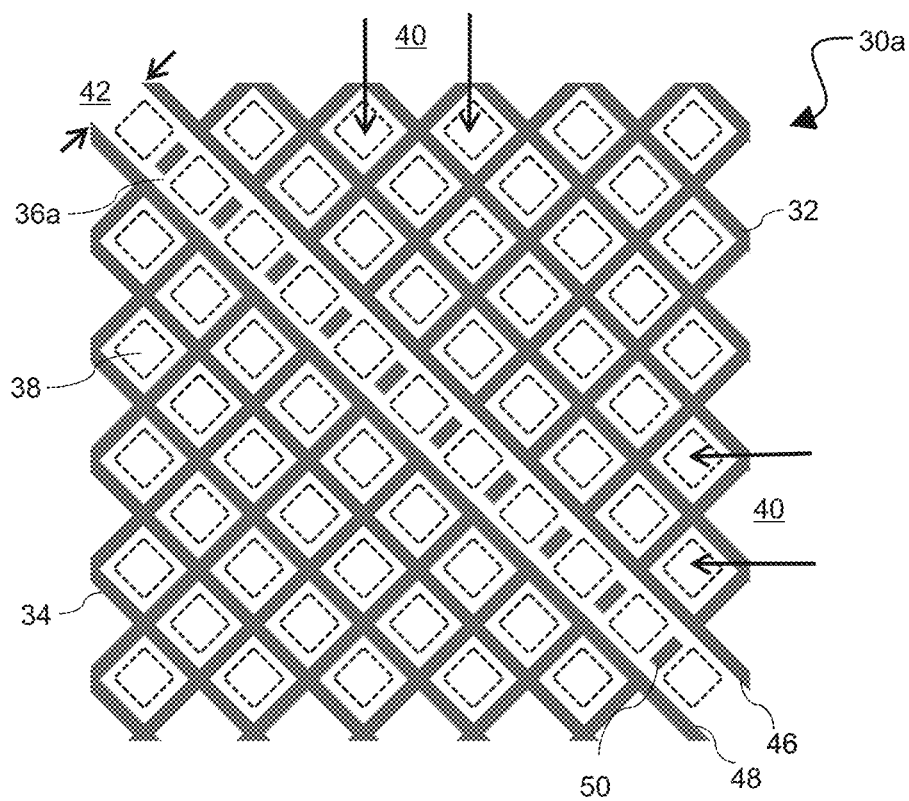
FIG. 6 is a drawing depicting a touch panel display configuration that employs a touch panel sensor electrode configuration that is a variation on the configuration of FIG. 4, which further includes inactive electrodes positioned within the insulating region.

FIG. 6 is a drawing depicting a touch panel display configuration 30a that employs a touch panel sensor electrode configuration that is a variation on the configuration of FIG. 4, which further includes inactive electrodes positioned within the insulating region. In particular, the insulating region 36a of FIG. 6 includes a plurality of inactive electrodes 50 arranged between the first electrode 32 and the second electrode 34. The term "inactive electrodes" denotes that the inactive electrodes 50 are formed conductively isolated from the first and second electrodes and from external electrical signals. The inactive electrodes 50 may be formed of the same material as the first and second electrodes. Comparing FIGS. 4 and 6, the insulating region 36 in FIG. 4 constitutes a substantial non-metal region, and thus creates a relatively large region of material variation relative to the regions of the continuous electrode mesh. By employing the inactive electrodes 50 in the insulating region 36a as shown in FIG. 6, the degree of material variation of the insulating region is reduced, which can reduce the visibility of the electrode configuration for a greater electrode separation distance. As in the previous embodiment, the electrode separation distance 42 is constant and uniform between the first electrode face 46 of the first electrode 32 and the second electrode face 48 of the second electrode 34.

Figure 7:
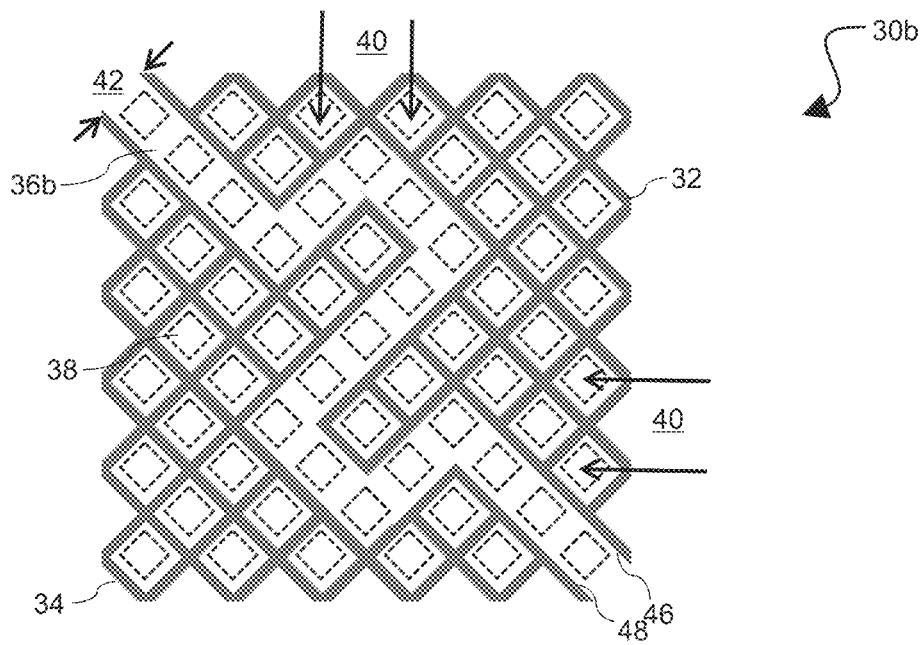
FIG. 7 is a drawing depicting a touch panel display configuration that employs a touch panel sensor electrode configuration that is a variation on the configuration of FIG. 4, in which the insulating region is a non-straight insulating region.

FIG. 7 is a drawing depicting a touch panel display configuration that employs a touch panel sensor electrode configuration that is a variation on the configuration of FIG. 4, in which the insulating region is a non-straight insulating region. In particular, FIG. 7 illustrates a touch panel configuration 30b having a non-conductive insulating region 36b that is formed to have a non-straight configuration. The configuration of FIG. 7 may be compared to the conventional configuration of FIG. 3 that employs a non-straight cut to separate the first and second electrodes. As referenced above, the non-straight cut shown in FIG. 3 still leaves the tendrils 44 of electrode material that extend into the insulating region 16a between the pixel regions 18, and thus the electrode separation distance 17/17a is non-uniform. In contrast, like the embodiment shown in FIGS. 4 and 6, in the embodiment of FIG. 7 the electrode separation distance 42 is constant and uniform between the first electrode face 46 of the first electrode 32 and the second electrode face 48 of the second electrode 34. Accordingly, for the reasons described above, also in the embodiment of FIG. 7 the rate of proportional decrease in mutual capacitance is greater than the rate of proportional decrease in signal magnitude of the output signal within the optimal range as illustrated in FIG. 5.

Figure 8:
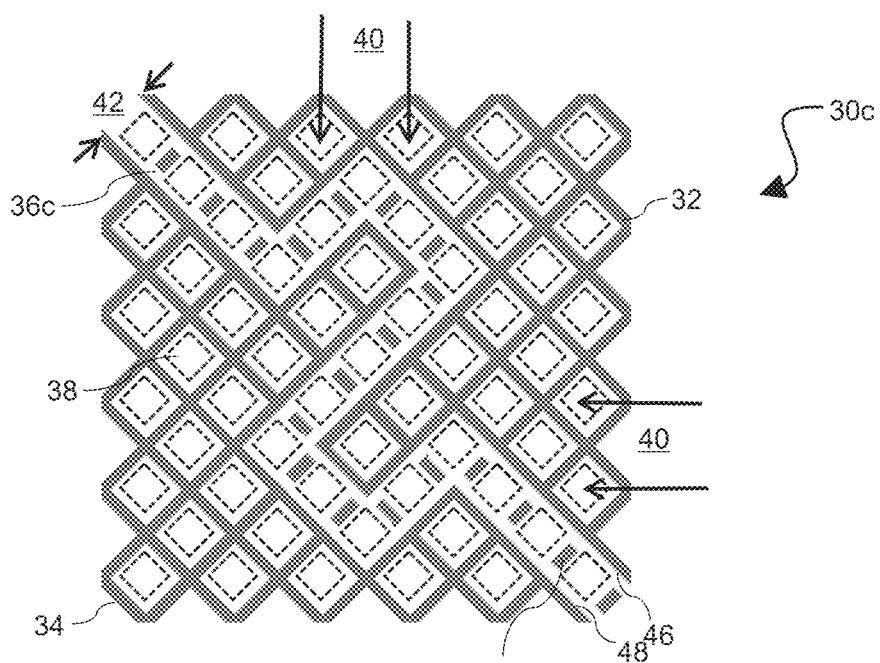
FIG. 8 is a drawing depicting a touch panel display configuration that employs a touch panel sensor electrode configuration that is a variation on the configuration of FIG. 7, which further includes inactive electrodes positioned within the insulating region.

FIG. 8 is a drawing depicting a touch panel display configuration 30c that employs a touch panel sensor electrode configuration that is a variation on the configuration of FIG. 7, which further includes inactive electrodes positioned within the insulating region. In particular, the insulating region 36c of FIG. 8 includes a plurality of inactive electrodes 52 arranged between the first electrode 32 and the second electrode 34. Again, the term "inactive electrodes" denotes that the inactive electrodes 52 are formed conductively isolated from the first and second electrodes and from external electrical signals. The inactive electrodes 52 may be formed of the same material as the first and second electrodes. Similarly as described above with respect to FIG. 6, by employing the inactive electrodes 52 the degree of material variation of the insulating region is reduced, which can reduce the visibility of the electrode configuration for a greater electrode separation distance. As in previous embodiments, the electrode separation distance 42 is constant and uniform between the first electrode face 46 of the first electrode 32 and the second electrode face 48 of the second electrode 34.

Figure 9:
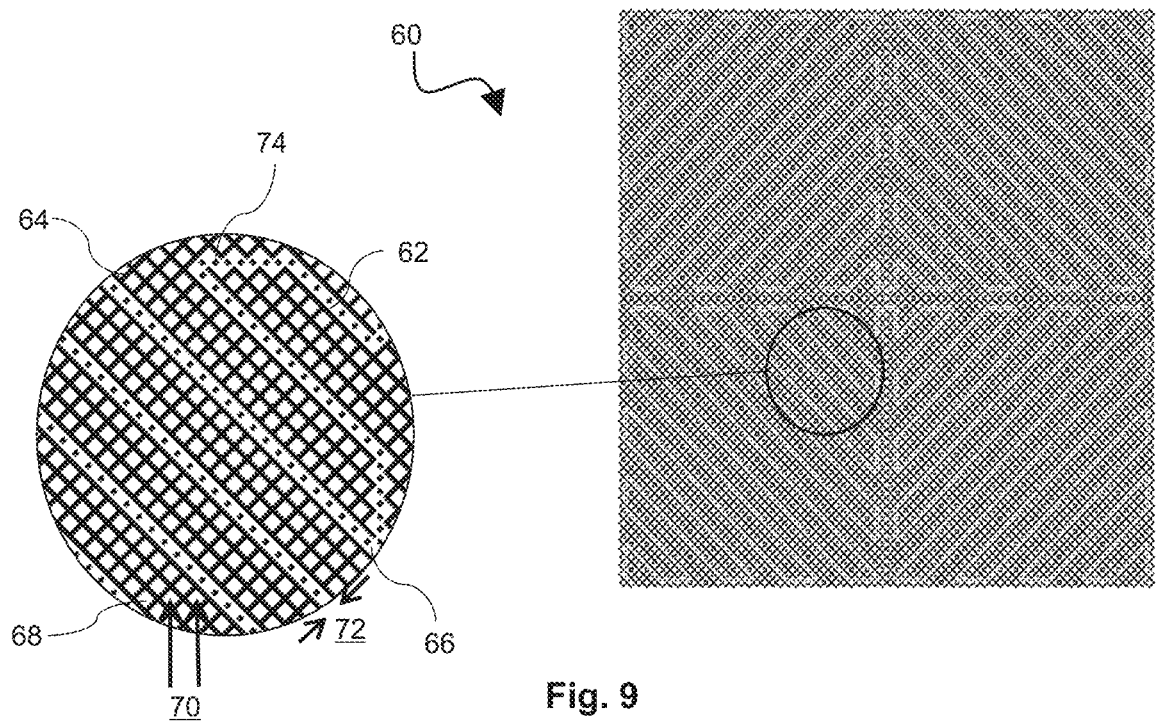
FIG. 9 is a drawing depicting a touch panel display configuration that employs a touch panel sensor having a fishbone electrode configuration.

The principles of the current application may be applied to various electrode configurations. FIG. 9 is a drawing depicting a touch panel display configuration 60 that employs a touch panel sensor having an electrode configuration with an interlacing pattern of first and second electrodes. Because of the nature of the interlacing pattern, such an electrode configuration commonly is referred to as a "fishbone" electrode configuration. Similar to previous embodiments, the touch panel display 60 includes a touch panel sensor having a touch electrode configuration that is overlaid onto a display panel that includes a plurality of pixel regions that emit light. The touch electrode configuration is configured as an opaque metal mesh including a first electrode 62 and a second electrode 64 that are separated by an insulating region 66 that electrically isolates the first electrode 62 from the second electrode 64. In the fishbone configuration, the first electrode 62 and the second electrode 64 are interlaced with each other. The opaque metal mesh configuration of the electrodes 62 and 64 overlays the display panel having pixel regions 68 that emit light for display of an image, with the opaque metal mesh being positioned outside of the pixel regions that emit light. In this manner, the touch electrode configuration does not interfere with light emission from the pixel regions 68 of the display panel.

A pixel pitch 70 of the pixel regions 68 again is defined as a distance between centers of two adjacent pixel regions in a same parallel line of pixel regions. An electrode separation distance 72 again is defined as a distance between the first electrode 62 and the second electrode 64 across the insulating region 66 in a direction perpendicular to opposing faces of the first and second electrodes. Similarly as in previous embodiments, in exemplary embodiments of the fishbone configuration with the interlacing first and second electrodes, the electrode separation distance may be related to the pixel pitch and is from 0.5 to 0.75 times the pixel pitch, or the electrode separation distance is from 30 to 50 µm, and may be from 35 to 45 µm. More generally, as above the electrode separation distance is in a range whereby (1) with increasing electrode separation distance a first rate of proportional decrease in mutual capacitance between the first and second electrodes is greater than a second rate of proportional decrease in signal magnitude of an output signal, and (2) a ratio (R) of the first rate to the second rate satisfies the relationship $1.0 < R < 2.5$. In the example of FIG. 9, the insulating region 66 includes a plurality of inactive electrodes 74 arranged between the first electrode 62 and the second electrode 64, but depending on the application the inactive electrodes may be omitted.

Figure 10:
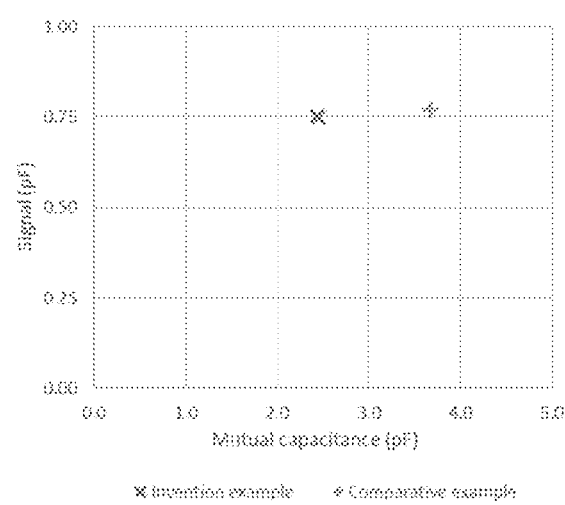
FIG. 10 is a graphical depiction of output signal magnitude as a function of mutual capacitance for a fishbone electrode configuration, illustrating a comparison of the example configuration of the current application and the conventional configuration.

A comparative example may be employed to demonstrate the benefits of the principles of the present application when employing a fishbone electrode configuration. In a typical fishbone electrode configuration, an example pixel pitch is 63 µm and an example thickness of the wire elements of the electrode mesh is 3.4 µm. In accordance with the principles of the present application, an example electrode separation distance 72 of FIG. 9 is 41.15 µm, whereas in a conventional fishbone electrode configuration the electrode separation distance is approximately 5.6 µm. FIG. 10 is a graphical depiction of output signal magnitude as a function of mutual capacitance, illustrating a comparison of the example configuration of the current application and the conventional configuration. In the conventional configuration with an electrode separation distance of 5.6 µm, a mutual capacitance is measured at approximately 3.7 pF with a corresponding resulting output signal magnitude measured at approximately 0.75 pF. In the configuration according to the present application, with an electrode separation distance of 41.15 µm, a mutual capacitance is measured at approximately 2.5 pF, but there is minimal drop-off of the resulting output signal magnitude despite the increased electrode separation. Accordingly, similarly as observed in the graph of FIG. 5, at such larger electrode separation distances of the current application, the rate of proportional decrease in mutual capacitance is greater than the rate of proportional decrease in signal magnitude of the output signal. This again permits configuring the electrode separation distance in a manner that optimally accounts for the competing considerations of lower mutual capacitance versus sufficient output signal magnitude and invisibility to the user.

The pixel arrangement illustrated in the previous embodiments is commonly referred to as a pentile diamond pixel layout based on the relative positioning and shape of the electrodes. Other common pixel layouts are stripe pixel layout and delta pixel layout. The principles of the current application are applicable to these and any other suitable pixel layouts.

Figure 11:
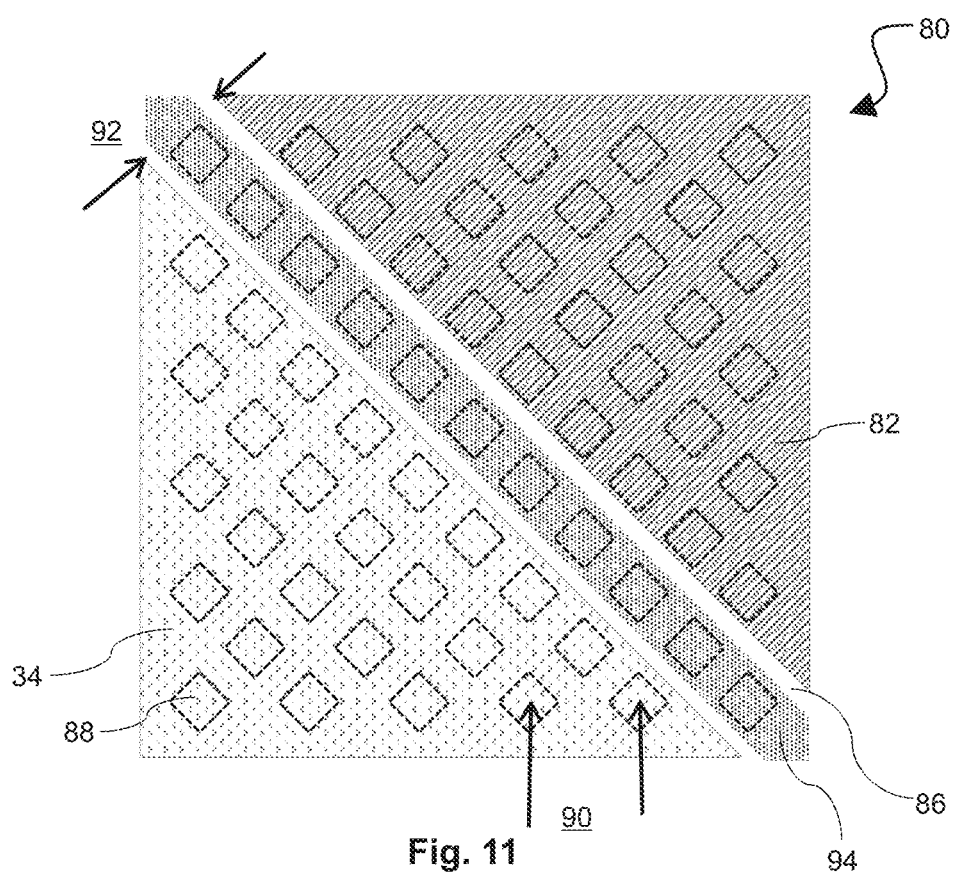
FIG. 11 is a drawing depicting a touch panel display configuration that employs a touch panel sensor having an electrode configuration with transparent first and second electrodes that overlay the display panel.

In the previous embodiments, the electrode configuration employed an opaque metal mesh configuration, whereby the electrode configuration is overlaid on the display panel outside of the pixel regions that emit light. The principles of the current application also may be applied to transparent electrode configurations, whereby transparent electrodes are overlaid on the display panel in a manner that spans over the pixel regions. Because the electrodes in such configuration are transparent electrodes, interference with light emitted from the pixel regions is minimized. A suitable material of the transparent electrodes, for example, is indium tin oxide (ITO). FIG. 11 is a drawing depicting a touch panel display configuration 80 that employs a touch panel sensor having an electrode configuration with transparent first and second electrodes that overlay the display panel. The touch electrode configuration includes a first transparent electrode 82 and a second transparent electrode 84 that are separated by an insulating region 86 that electrically isolates the first transparent electrode 82 from the second transparent electrode 84. The transparent electrodes 82 and 84 overlay the display panel having pixel regions 88 that emit light for display of an image, with the transparent electrodes specifically overlaying the pixel regions that emit light.

A pixel pitch 90 of the pixel regions 88 again is defined as a distance between centers of two adjacent pixel regions in a same parallel line of pixel regions. An electrode separation distance 92 again is defined as a distance between the first transparent electrode 82 and the second transparent electrode 84 across the insulating region 86 in a direction perpendicular to opposing faces of the first and second electrodes. Similarly as in previous embodiments, in exemplary embodiments of the transparent electrode configuration, the electrode separation distance may be related to the pixel pitch and is from 0.5 to 0.75 times the pixel pitch, or the electrode separation distance is from 30 to 50 µm, and may be from 35 to 45 µm. More generally, as above the electrode separation distance is in a range whereby (1) with increasing electrode separation distance a first rate of proportional decrease in mutual capacitance between the first and second electrodes is greater than a second rate of proportional decrease in signal magnitude of an output signal, and (2) a ratio (R) of the first rate to the second rate satisfies the relationship 1.0<R<2.5. In the example of FIG. 11, the insulating region 86 includes an inactive electrode 94 arranged between the first transparent electrode 82 and the second transparent electrode 84, but depending on the application the inactive electrodes may be omitted.

An aspect of the invention, therefore, is an improved design of a touch panel sensor having a touch electrode configuration that reduces mutual capacitance significantly, without a commensurate degrading of the output signal magnitude and while remaining invisible to a viewer. In exemplary embodiments, a touch panel display includes a display panel comprising a plurality of pixel regions that emit light, and a touch sensor comprising an electrode configuration that is configured as an opaque metal mesh that overlays the display panel with the opaque metal mesh being positioned outside of the pixel regions. The electrode configuration includes a first electrode and a second electrode that are separated by an insulating region, an electrode separation distance being a distance between the first electrode and the second electrode across the insulating region in a direction perpendicular to opposing faces of the first and second electrodes. The electrode separation distance is in a range whereby (1) with increasing electrode separation distance a first rate of proportional decrease in mutual capacitance between the first and second electrodes is greater than a second rate of proportional decrease in signal magnitude of an output signal, and (2) a ratio (R) of the first rate to the second rate satisfies the relationship 1.0<R<2.5. The touch panel display may include one or more of the following features, either individually or in combination.

In an exemplary embodiment of the touch panel display, the electrode separation distance is from 30 µm to 50 µm.

In an exemplary embodiment of the touch panel display, the electrode separation distance is from 35 µm to 45 µm.

In an exemplary embodiment of the touch panel display, the electrode separation distance is from 0.5 to 0.75 times a pixel pitch of the pixel regions.

In an exemplary embodiment of the touch panel display, the electrode separation distance is constant between a first electrode face of the first electrode and a second electrode face of the second electrode.

In an exemplary embodiment of the touch panel display, the first electrode is a drive electrode to which an electrical signal is inputted, and the second electrode is a sense electrode from which the output signal is measured.

In an exemplary embodiment of the touch panel display, the pixel regions are arranged in rows and columns, and the first electrode is a row electrode and the second electrode is a column electrode.

In an exemplary embodiment of the touch panel display, the insulating region is a non-straight insulating region.

In an exemplary embodiment of the touch panel display, the electrode configuration is made of a bulk metal material and the insulating region is made of an inorganic insulating material or an organic polymer.

In an exemplary embodiment of the touch panel display, the display further includes one or more inactive electrodes positioned within the insulating region between the first electrode and the second electrode.

In an exemplary embodiment of the touch panel display, the electrode configuration has a fishbone configuration in which the first electrode and the second electrode are interlaced.

In an exemplary embodiment of the touch panel display, the touch panel includes a display panel having a plurality of pixel regions that emit light, and a touch sensor comprising an electrode configuration that overlays the pixel regions of the display panel. The electrode configuration includes a first transparent electrode and a second transparent electrode that are separated by an insulating region, an electrode separation distance being a distance between the first transparent electrode and the second transparent electrode across the insulating region in a direction perpendicular to opposing faces of the first and second transparent electrodes. The electrode separation distance is in a range whereby (1) with increasing electrode separation distance a first rate of proportional decrease in mutual capacitance between the first and second transparent electrodes is greater than a second rate of proportional decrease in signal magnitude of an output signal, and (2) a ratio (R) of the first rate to the second rate satisfies the relationship 1.0<R<2.5.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

The present invention has applicability to touch panel devices, and in particular to capacitive type touch panel devices. Such capacitive type touch panel devices may find application in a range of consumer electronic products including, for example, mobile phones, tablet, laptop and desktop PCs, electronic book readers and digital signage products.

REFERENCE SIGNS LIST

10/10a—touch panel display
12—first or row electrode
14—second or column electrode
16/16a—insulating region
17/17a—electrode separation distance
18—pixel regions
20—drive electrode
21—sense electrode
22—voltage source
23—mutual coupling capacitance
24—charge measurement device
26—input object
27—first dynamic capacitance
28—second dynamic capacitance
30/30a/30b/30c—touch panel display
32—first or row electrode
34—second or column electrode
36/36a/36b/36c—insulating region
38—pixel regions
40—pixel pitch
42—electrode separation distance
44—tendrils
46—first electrode face
48—second electrode face
50—inactive electrodes
52—inactive electrodes
60—touch panel display
62—first or row electrode
64—second or column electrode
66—insulating region
68—pixel regions
70—pixel pitch
72—electrode separation distance
80—touch panel display
82—first or row electrode
84—second or column electrode
86—insulating region
88—pixel regions
90—pixel pitch
92—electrode separation distance

What is claimed is:

1. A touch panel display comprising:
a display panel comprising a plurality of pixel regions that emit light; and
a touch sensor comprising an electrode configuration that is configured as an opaque metal mesh that overlays the display panel with the opaque metal mesh being positioned outside of the pixel regions;
the electrode configuration comprising a first electrode and a second electrode that are separated by an insulating region, an electrode separation distance being a distance between the first electrode and the second electrode across the insulating region in a direction perpendicular to opposing faces of the first and second electrodes; and
wherein the electrode separation distance is in a range whereby (1) with increasing electrode separation distance a first rate of proportional decrease in mutual capacitance between the first and second electrodes is greater than a second rate of proportional decrease in signal magnitude of an output signal, and (2) a ratio (R) of the first rate to the second rate satisfies the relationship 1.0<R<2.5.

2. The touch panel display of claim 1, wherein the electrode separation distance is from 30 μm to 50 μm.

3. The touch panel display of claim 1, wherein the electrode separation distance is from 35 μm to 45 μm.

4. The touch panel display of claim 1, wherein the electrode separation distance is from 0.5 to 0.75 times a pixel pitch of the pixel regions.

5. The touch panel display of claim 1, wherein the electrode separation distance is constant between a first electrode face of the first electrode and a second electrode face of the second electrode.

6. The touch panel display of claim 1, wherein the first electrode is a drive electrode to which an electrical signal is inputted, and the second electrode is a sense electrode from which the output signal is measured.

7. The touch panel display of claim 1, wherein the pixel regions are arranged in rows and columns, and the first electrode is a row electrode and the second electrode is a column electrode.

8. The touch panel display of claim 1, wherein the insulating region is a non-straight insulating region.

9. The touch panel display of claim 1, wherein the electrode configuration is made of a bulk metal material and the insulating region is made of an inorganic insulating material or an organic polymer.

10. The touch panel display of claim 1, further comprising one or more inactive electrodes positioned within the insulating region between the first electrode and the second electrode.

11. The touch panel display of claim 1, wherein the electrode configuration has a fishbone configuration in which the first electrode and the second electrode are interlaced.

12. A touch panel display comprising:
- a display panel comprising a plurality of pixel regions that emit light; and
- a touch sensor comprising an electrode configuration that overlays the pixel regions of the display panel;
- the electrode configuration comprising a first transparent electrode and a second transparent electrode that are separated by an insulating region, an electrode separation distance being a distance between the first transparent electrode and the second transparent electrode across the insulating region in a direction perpendicular to opposing faces of the first and second transparent electrodes; and
- wherein the electrode separation distance is in a range whereby (1) with increasing electrode separation distance a first rate of proportional decrease in mutual capacitance between the first and second transparent electrodes is greater than a second rate of proportional decrease in signal magnitude of an output signal, and (2) a ratio (R) of the first rate to the second rate satisfies the relationship $1.0 < R < 2.5$.

13. The touch panel display of claim 12, wherein the electrode separation distance is from 30 μm to 50 μm.

14. The touch panel display of claim 12, wherein the electrode separation distance is from 35 μm to 45 μm.

15. The touch panel display of claim 12, wherein the electrode separation distance is from 0.5 to 0.75 times a pixel pitch of the pixel regions.

16. The touch panel display of claim 12, wherein the first transparent electrode is a drive electrode to which an electrical signal is inputted, and the second transparent electrode is a sense electrode from which the output signal is measured.

17. The touch panel display of claim 12, wherein the pixel regions are arranged in rows and columns, and the first transparent electrode is a row electrode and the second transparent electrode is a column electrode.

18. The touch panel display of claim 12, wherein the insulating region is made of an inorganic insulating material or an organic polymer.

19. The touch panel display of claim 12, further comprising one or more inactive electrodes positioned within the insulating region between the first transparent electrode and the second transparent electrode.

* * * * *